June 30, 1942. L. M. PERSONS 2,288,024
GAS VALVE
Filed Nov. 28, 1938 4 Sheets-Sheet 3

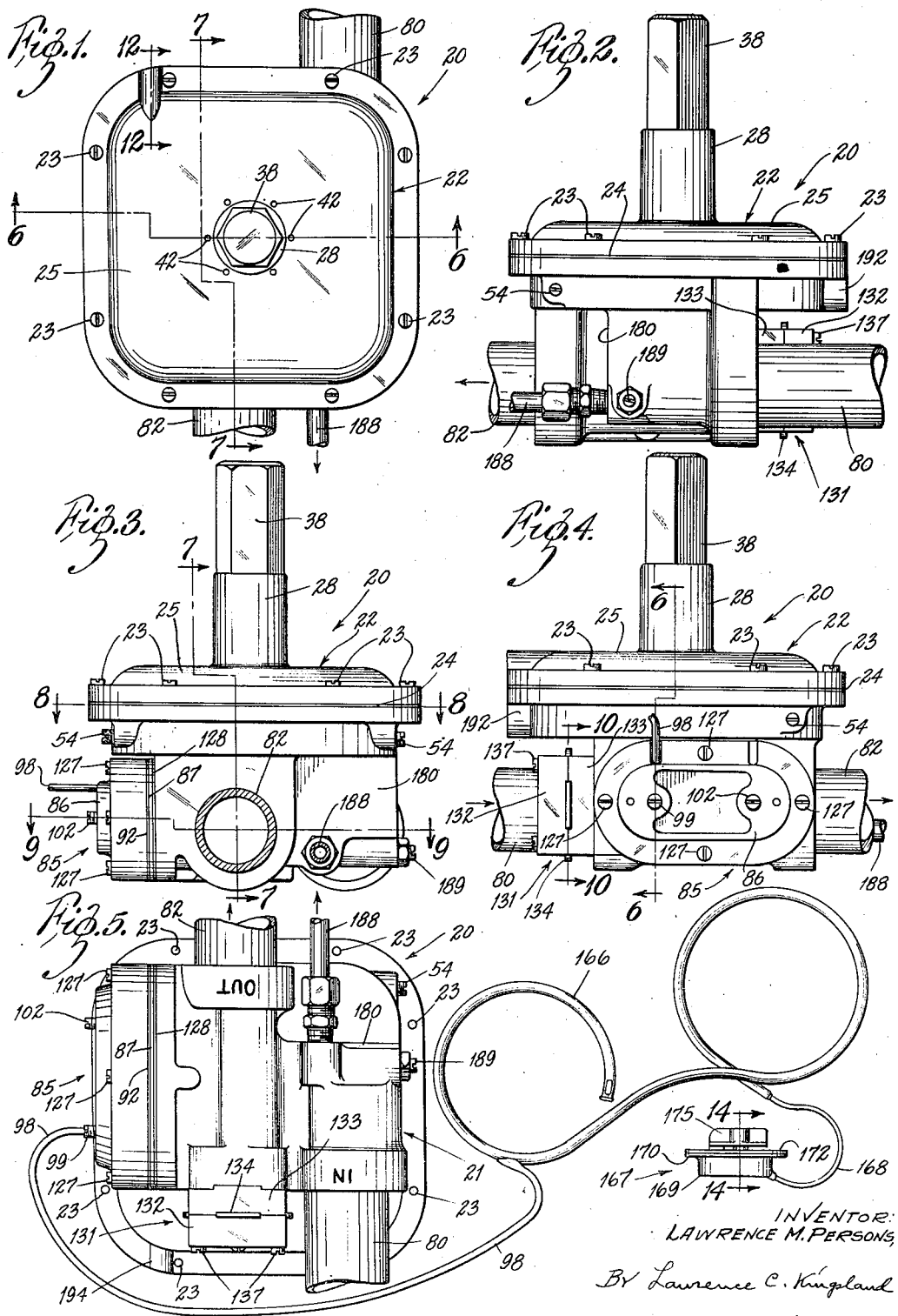

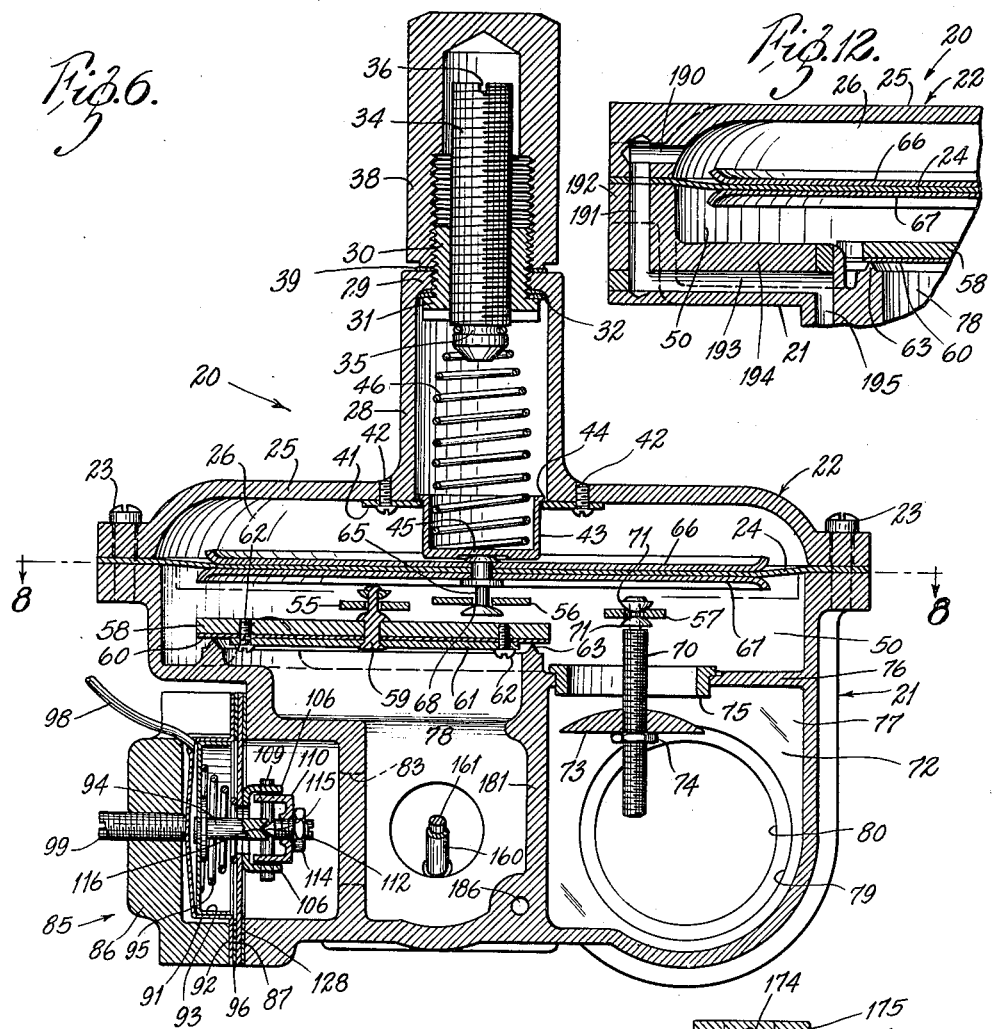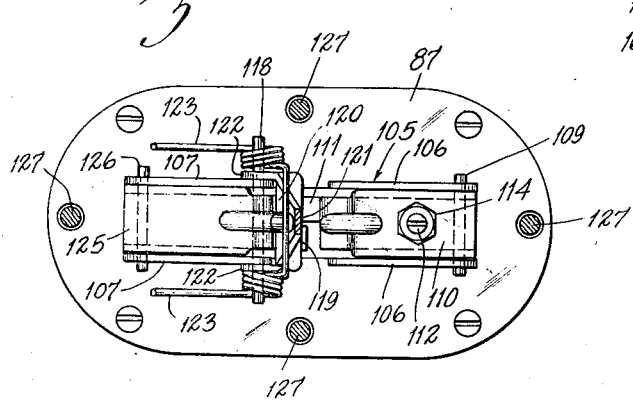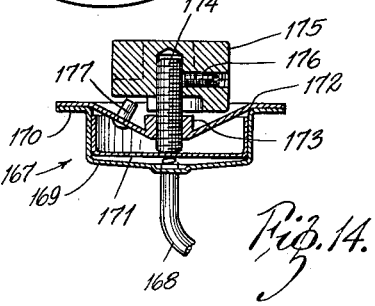

INVENTOR:
LAWRENCE M. PERSONS,
By Lawrence C. Kingsland
ATTORNEY.

June 30, 1942.  L. M. PERSONS  2,288,024
GAS VALVE.
Filed Nov. 28, 1938  4 Sheets-Sheet 4
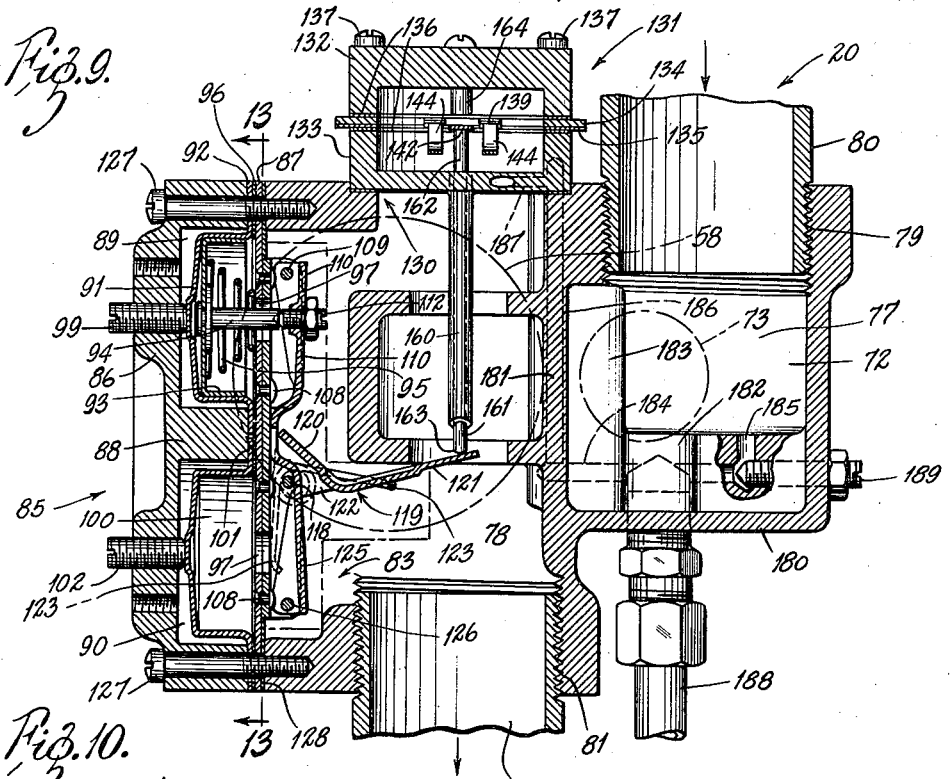
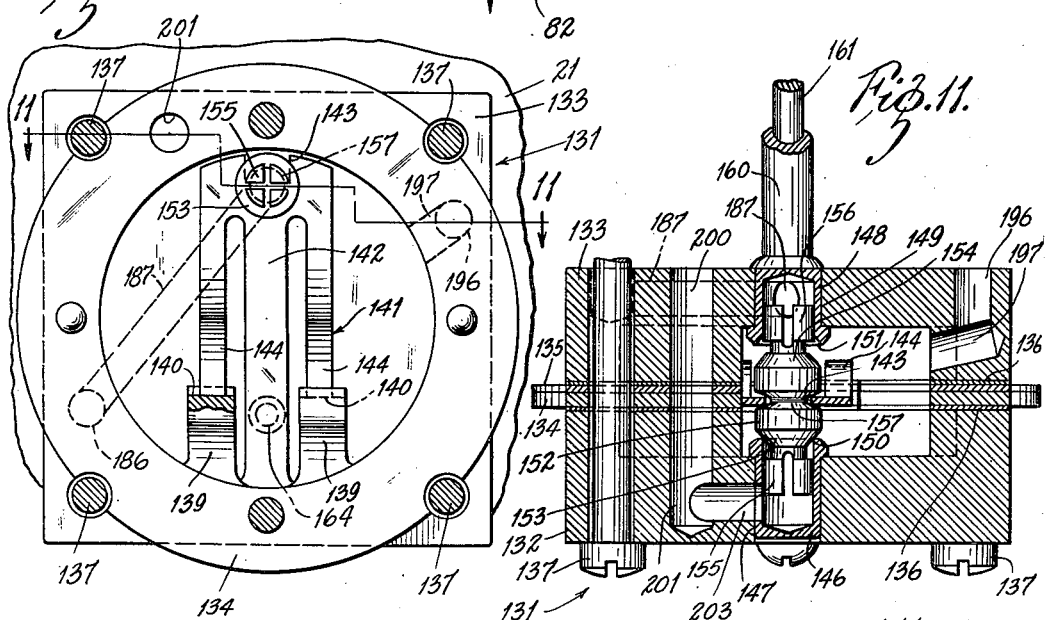
INVENTOR:
LAWRENCE M. PERSONS,
By Lawrence C. Kingsland
ATTORNEY.

Patented June 30, 1942

2,288,024

UNITED STATES PATENT OFFICE 2,288,024

GAS VALVE

Lawrence M. Persons, St. Louis County, Mo., assignor to Automatic Control Corporation, St. Louis, Mo., a corporation of Delaware Application November 28, 1938, Serial No. 242,748

6 Claims. (Cl. 50—5)

The present invention relates generally to valves, and more particularly to a combination on-and-off pressure regulator gas valve.

An object of the present invention is to provide a novel combined on-and-off and pressure regulator valve.

Another object is to provide a valve for the control of gas furnaces, or the like, which is thermally actuatable and which includes the combined features of an on-and-off valve and a pressure regulator valve.

Another object is to provide a thermally actuatable diaphragm gas valve which includes in combined relation a novel on-and-off valve and a novel pressure regulator valve.

Another object is to provide a diaphragm gas valve including novel on-and-off mechanism.

Another object is to provide a sturdy and efficient gas valve adapted to fulfill all of the objects and advantages sought therefor.

Other objects and advantages will be apparent from the following description, taken in conjunction with the accompanying drawings, in which:

Fig. 1 is a top view of a valve constructed in accordance with the teachings of the present invention, certain external thermal elements being broken away;

Fig. 2 is an elevation of one side of the valve shown in Fig. 1;

Fig. 3 is an elevation of another side of the valve shown in Fig. 1;

Fig. 4 is an elevation of a third side of the valve shown in Fig. 1;

Fig. 5 is a bottom view of the valve shown in Fig. 1, the thermal elements broken away in Fig. 1 being shown;

Fig. 6 is a section on the line 6—6 of Figs. 1, 4, and 8;

Fig. 9 is a section on the line 9—9 of Fig. 3;

Fig. 10 is a section on the line 10—10 of Figs. 4 and 7;

Fig. 11 is a section on the line 11—11 of Figs. 7 and 10;

Fig. 12 is a section on the line 12—12 of Fig. 8;

Fig. 13 is a section on the line 13—13 of Fig. 9; and

Fig. 14 is a section on the line 14—14 of Fig. 5.

Figure 7:
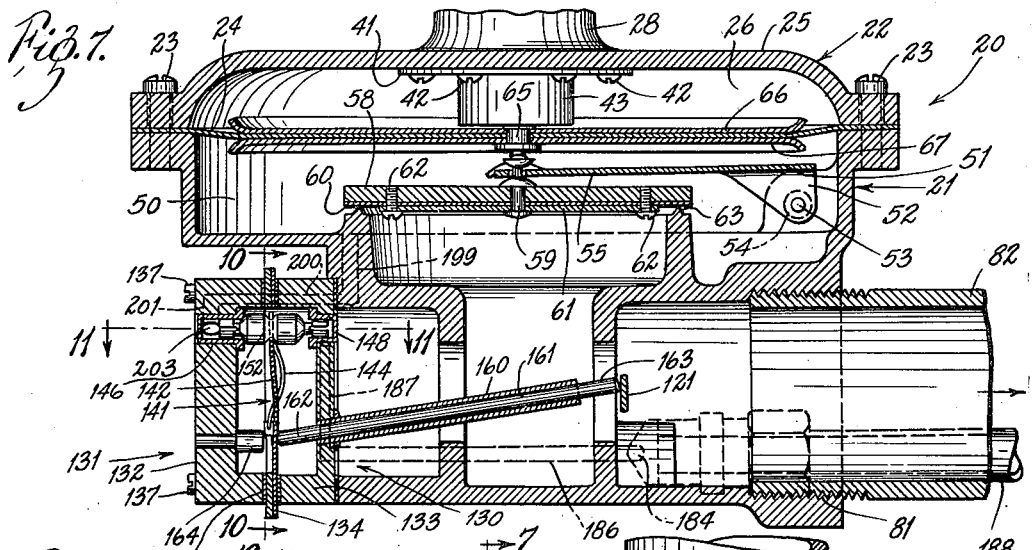
Fig. 7 is a section on the line 7—7 of Figs. 1, 3, and 8.

Referring to the drawings more particularly by reference numerals, 20 indicates generally a valve constructed in accordance with the teachings of the present invention. The valve 20 includes a main body casing 21 and a cover 22, both of which are preferably castings. The casing 21 and cover 22 are maintained in a closed relation by screws 23 (Figs. 6 and 7), and clamp between the opposed peripheral edges a flexible diaphragm 24.

The cover 22 is of the configuration clearly shown by Figs. 1 and 6, the planar portion 25 being spaced from the plane of the diaphragm 24 to form a chamber 26. A hollow stem 28 formed as an integral part of the cover 22 extends upwardly from the planar portion 25 and terminates in a circular flange 29, which is threaded to receive an internally and externally threaded sleeve 30, which includes a circular flange 31 disposed within the stem 28 and firmly pressing washers 32 against the interior face of the flange 29 to effect a sealing relation. A screw 34 engages the sleeve 30 internally and projects into the stem 28. The screw 34 has an annular groove 35 adjacent that end disposed within the stem 28, and a diametrically disposed slot 36 within the other end to permit adjustment of the screw 34. A cap 38 encloses the outer end of the screw 34, said cap 38 including internal threads which engage the outwardly disposed external threads of the sleeve 30. A washer 39 between the external face of the flange 29 of the stem 28 and the peripheral face of the cap 38 insures a tight seal therebetween.

A ring 41 is fixed against the internal face of the planar portion 25 by screws 42, the internal diameter of the ring 41 being smaller than the internal diameter of the stem 28 (Fig. 6). A cup 43 has an annular lip 44 adapted to engage the ring 41, the diameter of the cup 43 being substantially the same as the internal diameter of the ring 41. The cup 43 has a centrally located external depression 45 for a purpose to be described. A helical spring 46 is disposed with one end abutting the bottom of the cup 43 and the other end in engagement with the groove 35 in the screw 34. It is apparent that the spring 46 at all times biases the cup 43 towards the position shown in Fig. 6.

The casing 21 includes an upper chamber 50 (Figs. 6, 7, and 8) which is separated from the chamber 26 by the diaphragm 24. Within the chamber 50 is a large flat lever 51 pivoted through flanges 52 (Fig. 7) on the reduced extensions 53 (Fig. 8) of adjustable screws 54. The lever 51 includes three extensions 55, 56, and 57.

A valve 58 is suspended from the extension 55 of the lever 51 by a connecting member 59. The valve 58 has a leather face 60 maintained in position by a plate 61 which is secured to the main body of the valve 58 by screws 62, or the like. The leather face 60 of the valve 58 cooperates with the knife-edged valve seat 63.

The extension 56 of the lever 51 is connected to the diaphragm 24 by a suitable connecting member 65, the connecting member 65 being fixed to upper and lower plates 66 and 67, respectively, between which is clamped the major portion of the diaphragm 24. The lower end of the connecting member 65 removably engages a slot 68 in the extension 56. The upper portion of the connecting member 65 is adapted to rest within the depression 45 of the cup 43 so that the cup 43 contacts the upper plate 66 over a relatively large area.

A screw 70 is connected to the extension 57 of the lever 51 by suitable members 71 which engage a reduced extension of the screw 70. The screw 70 extends into a lower chamber 72 and supports within the chamber 72 a modulating valve 73 threadedly engaging the screw 70. A nut 74 locks the modulating valve 73 in a selected position. The modulating valve 73 cooperates with a valve seat 75 which is fixed in a wall 76 which separates the upper chamber 50 and the lower chamber 72.

The lower chamber 72 is subdivided into an inlet chamber 77 and an outlet chamber 78 by a wall (Figs. 6 and 9). The inlet chamber 77 has an annularly threaded opening 79 which receives a suitable fitting 80 (Fig. 9). Similarly, the outlet chamber 78 has a threaded annular opening 81 which receives a suitable fitting 82.

The outlet chamber 78 has a large opening 83 in one side (Fig. 9) which is closed by a housed thermally actuatable assemblage 85 (Figs. 4, 5, and 9). The assemblage 85 includes an elongated cup-shaped member 86 which is closed by a plate 87. The member 86, which is preferably a casting, is divided by a wall 88 interiorly into chambers 89 and 90. Within the chamber 89 is a cup 91 which has an annular flange 92 which continuously overlies the walls forming the chamber 89. A cup-shaped diaphragm 93 is sealed within the cup 91 to provide a space between the face of the said cup 91 and the diaphragm 93, from which leads a fluid containing tube 98 (Fig. 6). A post 94 is rigidly affixed to the diaphragm 93 centrally of the face thereof by suitable means. A spring 95 surrounds the post 94 and abuts the interior surface of the face of the diaphragm 93 and the interiorly disposed surface of the plate 87. A gasket 96 overlies the annular flange 92 and is contacted by the plate 87 to prevent leakage of gas from the chamber 78 through the assemblage 85. The post 94 extends through an opening 97 in the plate 87 for a purpose to be described. A screw 99 threadedly engages an aperture in the bottom of the member 86 and abuts the central portion of the exterior surface of the face of the cup 91.

Within the chamber 90 is a cup 100 having an annular flange 101 sealed between the ends of the walls of the chamber 90 and the plate 87 by a continuation of the gasket 91. An adjustment screw 102 threadedly engages an aperture in the member 86 and abuts the central portion of the external surface of the face of the cup 100. Provision is thus made for an assemblage similar to that just described as being within the chamber 89, which is essential where dual thermal control is required, but the same is unnecessary for the present purposes.

A supporting member 105 (Figs. 6, 9, and 13) having spaced pairs of walls 106 and 107 at the ends (Fig. 13) is fixed by rivets 108, or the like, to the plate 87. A pin 109 is journaled in apertures in the walls 106 and pivotally supports a lever 110 having an extension 111. An adjustable screw 112 threadedly engages a threaded aperture in the lever 110. The screw 112 is maintained in a selected relation by a lock nut 114 and has a point 115 (Fig. 6) which engages a depression 116 in the end of the post 94.

A pin 118 is journaled in suitable apertures in the walls 107 adjacent the interiorly disposed ends thereof. A bell crank lever 119 having arms 120 and 121 is journaled upon the pin 118 by extensions 122 (Figs. 9 and 13). A heavy briding spring 123 biases the bell crank lever 119 in a counterclockwise direction (Fig. 9) so that the arm 120 is forced into contact with the extension 111 of the lever 110.

A lever 125 is pivotally mounted on a pin 126 journaled in suitable apertures in the walls 107 which comprises part of the second thermal control means not essential for the present disclosure. It is to be understood that the second thermal control device is identical with the described thermal control device.

The assemblage 85 is secured to the casing 21 to close the large aperture 83 by long screws 127, a gasket 128 being disposed between the outer face of the plate 87 and the ends of the walls of the casing 21.

The third external wall forming chamber 78 has an aperture 130 which is closed by a box 131 (Figs. 4, 5, 7, and 9), preferably of brass. The box 131 includes two opposed portions 132 and 133 which enclose between the opposing edges a rigid metallic ring 134 and a metallic ring 135 of flexible material (Fig. 11). Gaskets 136 disposed to each side of the rings 134 and 135 effect a sealing relation to prevent the escape of gas. Long screws 137 secure the portions 132 and 133 in sealing relation, the portion 133 being braised or otherwise secured in fixed relation with the wall of the casing 21.

Within the interior of the box 131 are spaced posts 139 (Fig. 10) which are integral extensions of the ring 134. Each post 139 includes a groove 140 in the end thereof. Also within the box 131 is a snap-action blade 141 which is an integral extension of the flexible ring 135. The blade 141 includes a main portion 142 in the end of which is a U-shaped notch 143, and integral spring fins 144 alongside the main portion 142, the free extremities of which are disposed within the groove 140. The fins 144 are normally buckled to insure snap action of the blade 141.

A cup 146 (Fig. 11) is fixed within the aperture 147 in the bottom wall of the portion 132. A cup 148 is fixed within the aperture 149 in the bottom wall of the portion 133, the cup 148 and the cup 146 being in opposing relation. The free edges of the cups 146 and 148 comprise valve seats 150 and 151, respectively. A valve 152 having spaced opposed valve faces 153 and 154 reciprocates in the cups 146 and 148, being supported therein by supporting extensions 155 and 156, respectively. An annular groove 157 is disposed in the valve 152 centrally of the faces 153 and 154, which is engaged by the U-shaped notch 143 of the blade 141 (Figs. 10 and 11).

An elongated tube 160 (Figs. 7 and 9) is fixed in an aperture in the main wall of the portion 133 of the box 131, the tube 160 being angularly disposed relative to the plane of the rest of the valve 20. A shaft 161 is slidably disposed within the tube 160, being of a length to extend from both ends thereof. One end 162 extends into the box 131 and abuts the main portion 142 of the blade 141 adjacent the lower reach thereof, while the other end 163 is adjacent the arm 121 of the bell crank lever 119. A stop 164 is fixed to the main wall of the portion 132 of the box 131 in opposing relation to the end 162 of the shaft 161.

The tube 98 (Fig. 5) is connected to an elongated bulb 166 at an intermediate point. An adjustment device 167 is connected by a tube 168 to one end of the bulb 166.

The adjusting device 167 (Fig. 14) includes a cup 169 having a flange 170. A diaphragm 171 is fixed within the cup 169 in the usual manner. A member 172 of the cross-section shown in Fig. 14 is fixed to the flange 170 of the cup 169 and includes a centrally disposed internally threaded boss 173. A screw 174 to which is fixed a knob 175 by a set screw 176 threadedly engages the boss 173 and abuts the central portion of the diaphragm 171. A stop 177 fixed to the member 172 limits the downward movement of the screw 174.

One wall 180 of the chamber 77 and the wall 181 separating the chambers 77 and 78 (Figs. 9 and 6) include thickened portions 182 and 183, respectively, adjacent the bases thereof. Within the thickened portion 182 is a passage 184 which opens into the chamber 77 by a passage 185. Within the enlarged portion 183 is a passage 186 which communicates at one end with the passage 184 and at the other end with a passage 187 in the base of the portion 133 of the box 131 (Figs. 10 and 11). The passage 187 opens into the cup 148 (Fig. 11) through an aperture in the wall thereof. Connecting into an intermediate portion of the passage 184 is a pilot light lead 188 (Fig. 9). An adjusting screw 189 is connected with the passage 184 at one end thereof (Fig. 9) providing means for selectively controlling the flow area of the passage 184.

Figure 8:
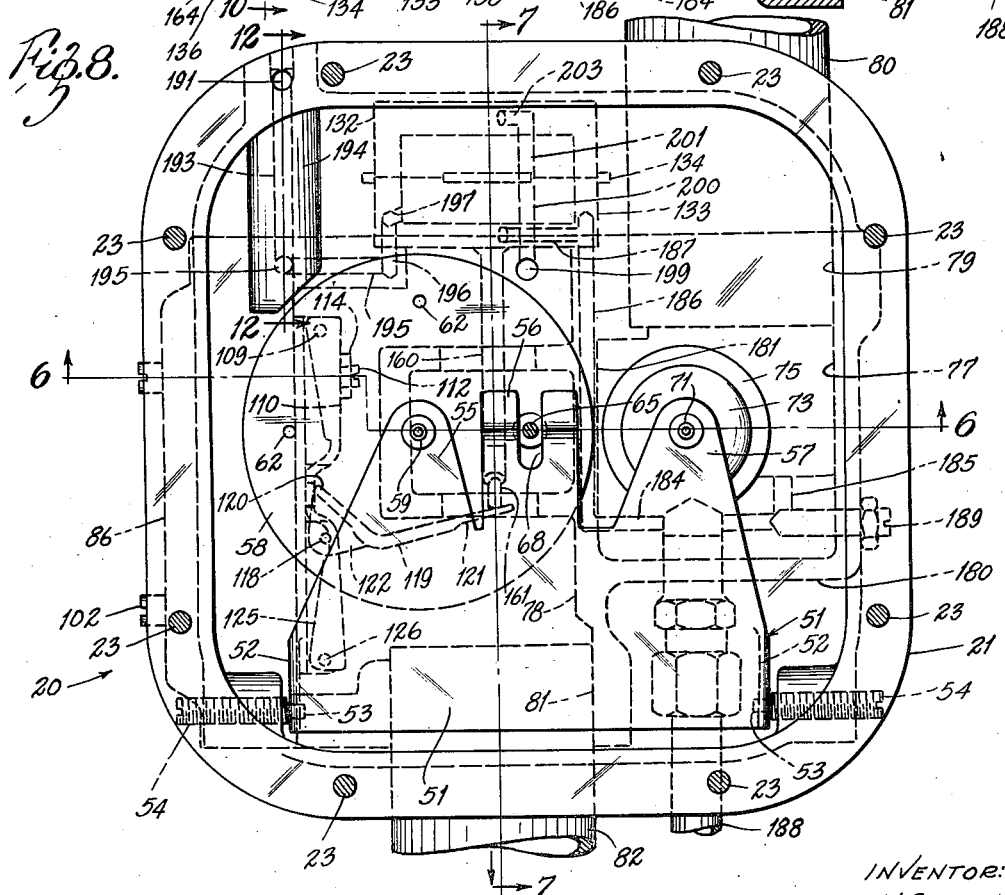
Fig. 8 is a section on the line 8—8 of Figs. 3 and 6.

Leading from the chamber 26 is a passage 190 (Fig. 12) which communicates with a vertical passage 191 is an enlargement 192 formed integral with one of the walls defining the upper chamber 50. A passage 193 in an enlargement 194 (Figs. 8 and 12) communicates at one end with the passage 191 and at the other end with an angularly disposed passage 195. A horizontal passage 196 in the topmost disposed wall of the portion 133 of the box 131 communicates with the lower end of the passage 195 (Figs. 8 and 11). The passage 196 communicates with an angularly disposed short passage 197 (Figs. 8, 10, and 11) which opens into the box 131.

A vertical passage 199 (Figs. 7 and 8) leads from the chamber 50 and communicates at the lower end with one end of a horizontal passage 200 in the upper wall of the portion 133 of the box 131. The passage 200 at its other end communicates with a horizontal passage 201 in the upper edge of the portion 132 of the box 131. An angularly disposed passage 203 (Figs. 7 and 11) connects the passage 201 with the interior of the cup 146 through an aperture in the wall thereof.

From the foregoing description of the passages, it is clear that the chamber 26, the chamber 50, and the pilot light lead 188 communicate with the interior of the box 131. When the valve 152 is engaged with the seat 150, gas from the chamber 26 can flow to the pilot light lead 188 and thence to the pilot light as follows: from the chamber 26, the gas flows successively through the passage 190 (Fig. 12), the passage 191, the passage 193, the passage 195 (Fig. 8), the passage 196 (Fig. 11), the passage 197, the interior of the box 131, the cup 148, the opening in the side of the cup 148, the passage 187 (Fig. 9), the passage 186, the passage 184, and into the pilot light lead 188. The passage 184 is in communication with the chamber 77 through the passage 185 (Fig. 9), but the communication is restricted by the adjustment screw 189 and gas, of course, in accordance with its characteristics, will flow to the atmosphere at the pilot flame rather than against the line pressure.

When the valve 152 is engaged with the seat 151, gas from the chamber 50 can flow to the chamber 26 as follows: gas under pressure leaves the chamber 50 and successively passes through the vertical passage 199 (Figs. 7 and 8), the passage 200, the passage 201 (Fig. 11), the passage 203, the opening in the wall of the cup 146, the cup 146, the interior of the box 131, the passage 197, the passage 196, the passage 195 (Fig. 8), the passage 193 (Fig. 12), the passage 191, the passage 190, and into the chamber 26.

It is, of course, to be understood that the particular configuration of the above-described elements may be changed as within the scope of the invention, as may the location of the passages connecting the several chambers and cups.

*Operation*

The constituent elements of the valve 20 are shown in the drawings in the operative relationship with the main burner out, but with the area in which is located the bulb 166 having just demanded heat. In other words, the several parts are shown in the respective positions assumed when the main burner is off, but just about to be automatically relighted.

The valve 20 is disposed in a gas line which feeds gas to the main burner and to the pilot light of a gas furnace employed for heating some predetermined space. The bulb 166 is located within the area the temperature of which is to be controlled. The pilot light to which the pilot lead 188 runs is adjusted to a desired flame from a manipulation of the adjusting screw 189, the adjusting screw 189 permitting just enough gas to pass from the chamber 77 through the passage 185 and that portion of the passage 184 to the pilot light connection with the pilot lead 188 to maintain the pilot light at the desired flame.

As illustrated, the space heated by the main burner has just cooled to the point where the valve 152 has been snapped into the position shown in Fig. 11, an action which results when the fluid within the thermostat contracts sufficiently to permit the bell crank 119 to assume the position shown in Fig. 9. The snap action of the valve 152 is effected by the blade 141, which is constructed to snap the valve 152 to either of its seats 150 or 151 by an overcenter action, the valve 152 being actuated to seat 150 by the shaft 161 and the thermostat and to seat 151 by the spring fins 144. When the valve 152 engages the seat 150, communication between the chamber 26 above the diaphragm 24 and the chamber 50 directly beneath the diaphragm 24 is interrupted. However, communication is established immediately between the chamber 26 and the pilot lead 188. Gas in the chamber 26 under line pressure immediately passes to the pilot flame, momentarily enlarging this flame, thereby reducing to atmosphere the pressure on that side of the diaphragm 24 within the chamber 26. Gas at gas line pressure within the chamber 50, which has reached chamber 50 by passing through chamber 77 and through the opening defined by the valve seat 75, forces the diaphragm 24 upwardly (Fig. 6) against the action of the spring 46. As the diaphragm 24 moves upwardly, it carries with it the lever 51 and therethrough the valve 58 which is suspended from the extension 55 of the lever 51. As the valve 58 moves from its seat 63, gas rushes into the chamber 78 and into the fitting 82, whence it travels by suitable piping to the main burner (not shown). The burner ignites and immediately begins to perform its function of sending heat to the predetermined space being heated.

As the space being heated warms up, the fluid within the bulb 166 and the associated tubing expands, forcing the lever 110 to pivot counter-clockwise (Fig. 9), which pivots the bell crank 119 clockwise, thereby moving the arm 121 away from the shaft 161 to permit the blade 141 to snap the valve 152 into engagement with the seat 151. Communication is immediately interrupted between the chamber 26 and the pilot light lead 188, and communication is established between the chamber 26 and the chamber 50. Gas under line pressure passes from the chamber 50 into the chamber 26. The pressure of the gas combined with the force of the spring 46 forces the diaphragm 24 downwardly (Fig. 6) to lower the lever 51 which lowers the valve 58 into engagement with its valve seat 63. The flow of gas to the main burner is thereupon interrupted and the main burner goes out. The pilot light, of course, continues to function, inasmuch as the gas continues to pass to it from the main line.

There is provided means for preventing an undue gas line pressure from forcing the diaphragm 24 to a position to permit more than a sufficient amount of gas to pass to the main burner. As the diaphragm 24 is moved upwardly, the valve 73 is also moved upwardly towards its seat 75, for it is attached to the extension 57 of the lever 51. It is apparent that, as the vlave 58 moves upwardly to permit a greater amount of gas to pass to the main burner therethrough, the valve 73 moves upwardly towards its seat 75 to cut down on the amount of gas passed from the chamber 77 into the chamber 50. The valve 73, therefore, functions as a pressure regulator. The valve 73 is adjusted in its position on the screw 70 so that a gas pressure can obtain within the chamber 50 to insure a reasonably constant flame of the main burner.

It is apparent, therefore, that there has been described a gas valve which combines the features of an on-and-off valve and a pressure regulator valve. The cooperating functioning of these several features provides an efficient and thoroughly effective gas valve.

It is apparent that the gas valve comprising the subject matter of the present invention includes a large number of adjustable features so that the valve is capable of functioning under a wide range of conditions. The force exerted by the spring 46 can be adjusted through manipulation of the screw 34, which can be reached merely by removal of the cap 38. The lateral position of the lever 51 can be varied through movement of the adjustable screws 54 which support the same. The position of the valve 73 on the screw 70 can be readily changed through movement of the lock nut 74 and subsequent rotation of the valve 73. The relative movement of the bell crank 119 can be adjusted both as to time of movement and distance of travel by manipulation of the screws 99 and 112. The flow of gas from the main line to the pilot light can be varied through rotation of the adjusting screw 189. The thermostat can be set for temperature of operation by the adjustment device 167. It is, therefore, clear that the pressure gas valve 20 is very flexible.

It is to be understood that the foregoing description and accompanying drawings have been given by way of illustration and example, and not for purposes of limitation, the device being limited only by the claims which follow.

What is claimed is:

1. A gas valve including a casing having therein a diaphragm, a chamber on each side of said diaphragm, an exit chamber, a valve in one of said chambers connected to said diaphragm adapted to close a gas passage between said one of said chambers and the exit chamber when said gas valve is seated, an inlet chamber, a valve in said inlet chamber connected to said diaphragm adapted to close gas communication between said inlet chamber and said one of said chambers when closed, and means for automatically introducing gas into and releasing gas from the other chamber for moving the diaphragm.

2. A gas valve comprising a casing having an inlet chamber, an intermediate chamber, and an outlet chamber, a valve and its seat within the intermediate chamber adapted when closed to interrupt the flow of gas in the line in which the gas valve is disposed, a diaphragm separating the intermediate chamber and a fourth chamber, means connecting said diaphragm and said valve, means for moving said diaphragm to move said valve, and means to regulate the position of said valve relative to its seat to determine the gas flow including a second valve and its seat in the inlet chamber, said second valve being connected to said diaphragm and being located to move towards its seat as the valve in the intermediate chamber moves away from its seat.

3. A gas valve comprising a casing having an inlet chamber, an intermediate chamber, and an outlet chamber, a valve and its seat within the intermediate chamber adapted when closed to interrupt the flow of gas in the line in which the gas valve is disposed, a diaphragm separating the intermediate chamber and a fourth chamber and being subjected to line pressure when said valve is closed, means connecting said diaphragm and said valve, means to regulate the position of said valve relative to its seat to determine the gas flow including a second valve and its seat in the inlet chamber, said second valve being connected to said diaphragm and being located to move towards its seat as the first mentioned valve moves away from its seat, and means for introducing gas at line pressure into said fourth chamber and for exhausting gas therefrom to respectively close and open the first mentioned valve.

4. A gas valve including a casing having therein a chamber, a diaphragm, a valve and its seat in said chamber on one side of said diaphragm adapted to interrupt flow through said gas valve when in closed position, said diaphragm being under line pressure when said valve is closed, a lever in said chamber connected to said diaphragm and to said valve, a second chamber, a valve and its seat in said second chamber, a connection between said second chamber valve and the lever, said second chamber valve being adapted to move towards its seat as the first chamber valve moves away from its seat, and means for introducing gas at line pressure to the other side of said diaphragm and for exhausting gas therefrom to respectively close and open the first mentioned valve.

5. A gas valve comprising a casing, a pressure-actuated diaphragm within the casing, a chamber on each side of the diaphragm, a lever pivoted to the casing disposed within one chamber, said lever being connected to the diaphragm for movement therewith, an inlet chamber, an outlet chamber, a valve within the said one of said chambers connected to the lever for movement therewith adapted to close an opening between the outlet chamber and the said one of said chambers when in one extreme position of movement, a second valve in the inlet chamber connected to the lever for movement therewith adapted to move towards and away from an opening between the inlet chamber and the one of said chambers, and means for exhausting gas from and introducing gas into the other of said chambers to control the movement of the diaphragm.

6. A gas valve comprising a casing, a pressure-actuated diaphragm within the casing, a first chamber on one side of said diaphragm, a second chamber on the other side of said diaphragm, a gas passage leading into said second chamber and a gas passage leading from said second chamber, a valve within the second chamber, the position of which determines the flow of gas from the second chamber to a point of consumption, said valve being connected to said diaphragm for movement therewith, said second chamber and the underside of said diaphragm being subjected to line pressure when said valve is in closed position, a passage connecting the first chamber and the second chamber, a passage connecting the first chamber and atmosphere, and means for automatically alternately blocking one of said passages to control the gas pressure within the first chamber to determine the position of the diaphragm and therethrough the position of the valve.

LAWRENCE M. PERSONS.